United States Patent [19]

Byrne

[11] Patent Number: 4,528,095
[45] Date of Patent: Jul. 9, 1985

[54] FILTERING SYSTEM FOR POTABLE WATER

[76] Inventor: James J. Byrne, 322 Adolphus Ave., Cliffside Park, N.J. 07010

[21] Appl. No.: 461,448

[22] Filed: Jan. 27, 1983

[51] Int. Cl.³ .............................................. B01D 27/02
[52] U.S. Cl. ..................... 210/206; 210/264; 210/416.3; 210/424; 210/474; 222/399
[58] Field of Search ............... 210/205, 206, 420, 424, 210/476, 474, 473, 332, 282, 482, 416.3, 172, 244, 257.1, 245, 258, 260, 266, 283, 501, 246, 264; D23/1-4; 222/132, 137, 145, 189, 330, 331, 399

[56] References Cited

U.S. PATENT DOCUMENTS

| | | | |
|---|---|---|---|
| D. 213,690 | 4/1969 | Eckstrom | D23/3 |
| 219,817 | 9/1879 | Jewett | 210/474 |
| D. 224,105 | 7/1972 | Turturro | D23/1 |
| D. 227,886 | 7/1973 | Martinez | D23/1 |
| D. 230,358 | 2/1974 | Mann | D23/4 |
| D. 235,015 | 4/1975 | Stern | D23/3 |
| D. 235,206 | 5/1975 | Bertrand | D23/1 |
| D. 241,178 | 8/1976 | Haythornthwaite | D23/3 |
| D. 242,249 | 11/1976 | Corder et al. | D23/1 |
| D. 253,715 | 12/1979 | Emery | D23/1 |
| D. 260,175 | 8/1981 | Hein et al. | D24/21 |
| D. 267,032 | 11/1982 | Lafontaine | D23/3 |
| 406,126 | 7/1889 | Curran | 210/473 |
| 541,676 | 6/1895 | Peschges | 210/416.3 |
| 600,451 | 3/1898 | Roads | 210/416.3 |
| 715,554 | 12/1902 | Craine | 210/416.3 |
| 1,556,426 | 10/1925 | Coop | 65/338 |
| 1,748,654 | 2/1930 | Palmer et al. | 210/474 |
| 1,954,728 | 4/1934 | Dolan | 222/399 |
| 2,432,261 | 12/1947 | Thompson | 222/399 |
| 2,761,832 | 9/1956 | Robb et al. | 210/282 |
| 3,539,049 | 11/1970 | D'Eustachio | 210/477 |
| 3,746,174 | 7/1973 | Watanabe | 210/282 |
| 3,785,497 | 1/1974 | Giffard | 210/282 |
| 3,950,253 | 4/1976 | Stern | 210/85 |
| 4,054,526 | 10/1977 | Muller | 210/245 |
| 4,064,049 | 12/1977 | Calvano | 210/247 |
| 4,218,317 | 8/1980 | Kirschmann | 210/117 |
| 4,277,332 | 7/1981 | Baughn | 210/96.2 |
| 4,277,333 | 7/1981 | Coppola | 210/136 |

Primary Examiner—Richard V. Fisher
Assistant Examiner—Wanda L. Millard
Attorney, Agent, or Firm—Thomas Adams

[57] ABSTRACT

A filtering system for potable water has a stand and a basket-shaped filter for filtering potable water. The stand has an upper cantilevered branch with an opening sized to hold said filter. This filter is detachably mounted in the opening.

12 Claims, 10 Drawing Figures

FIG. 1
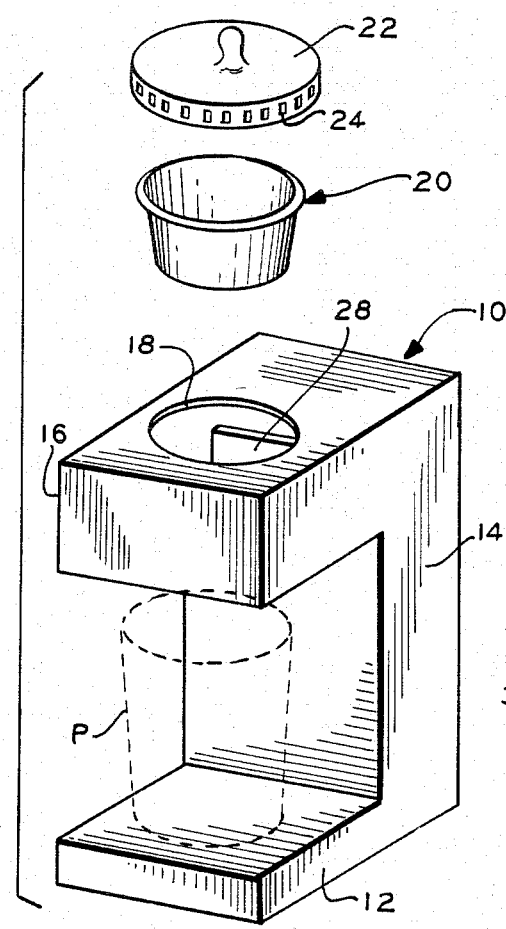
FIG. 2
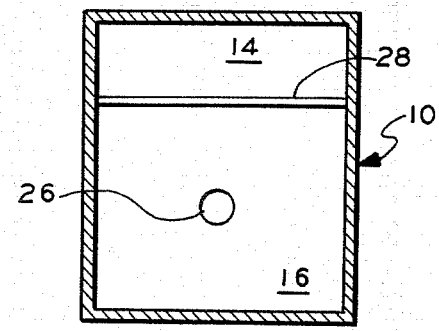
FIG. 3
FIG. 5
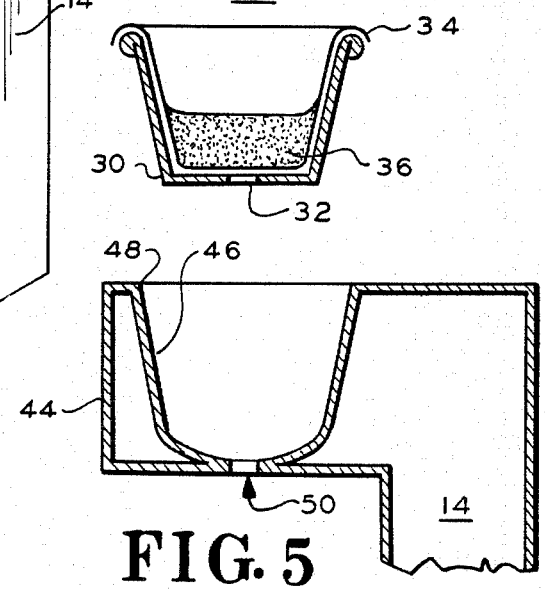
FIG. 4
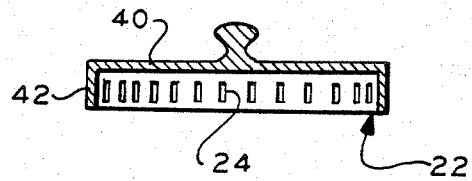

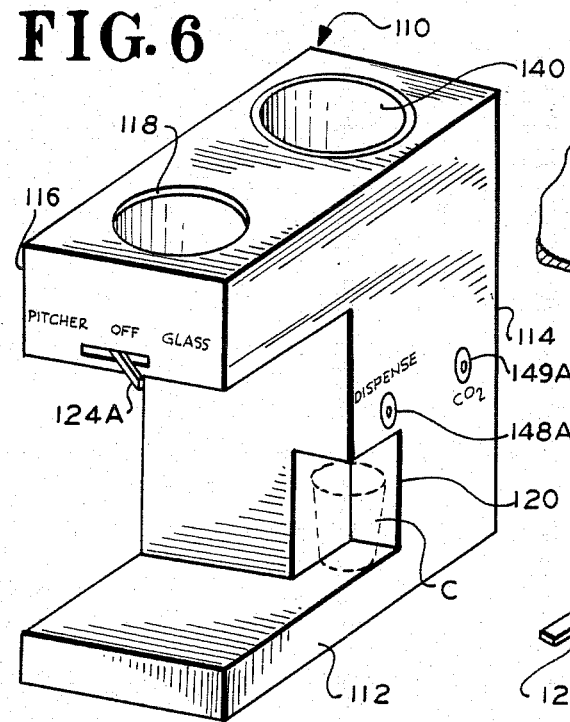
FIG. 6
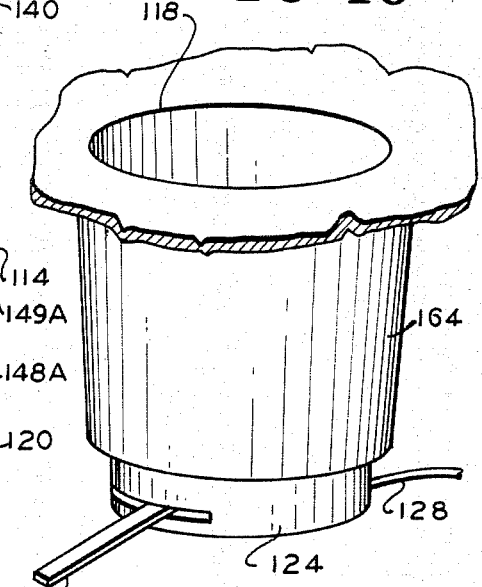
FIG. 10
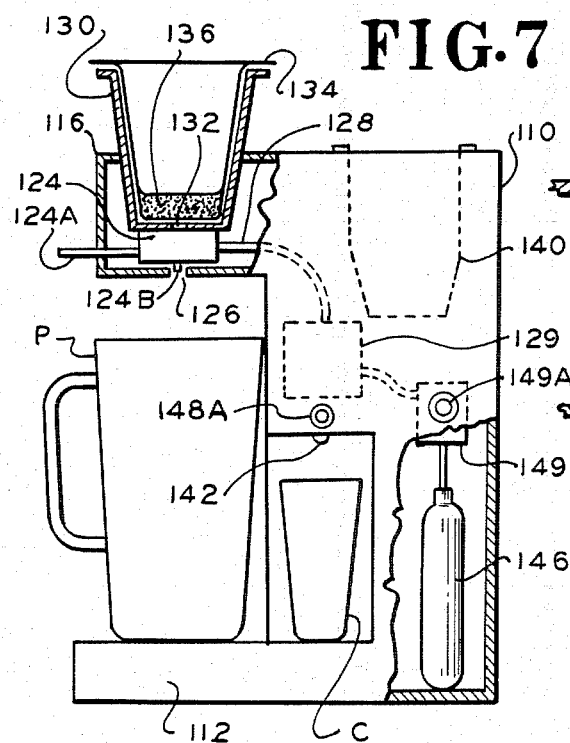
FIG. 7
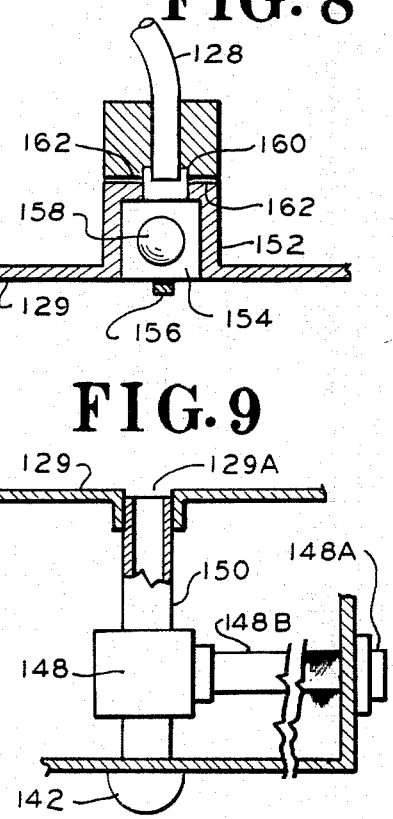
FIG. 8
FIG. 9

FILTERING SYSTEM FOR POTABLE WATER

BACKGROUND OF THE INVENTION

The present invention relates to filtering systems for potable water, and in particular, to systems using a removable filter It is known to line a funnel with filter paper to remove particulate contaminants from potable water. In the laboratory, the funnel can be mounted in a ring stand so that water can be poured from above and captured below in a container. It is also known to mix activated charcoal into the water to remove various contaminants.

A known in-line filter can filter tap water. A disadvantage with this type of system is that a relatively large filter is required to sustain the flow rate normally required for family or household use. Also, a separate high pressure valve must be employed to bypass the in-line filter when not needed. Disadvantage with these known filters is that the filter is continuously moist so that the possibility for bacteria, mold, fungus or algae to grow and to contaminate the potable water is high.

Accordingly, there is a need for filtering systems which can accommodate the flow rate needed in many applications yet avoiding continuous moisture which can promote plant and bacterial growth.

SUMMARY OF THE INVENTION

In accordance with the illustrative embodiments demonstrating features and advantages of the present invention, there is provided a filtering system for potable water. The filtering system includes a stand and a basket-shaped filter for filtering potable water. This stand has an upper cantilevered branch with an opening sized to hold said filter. The filter is detachably mounted in the opening.

By employing apparatus of the foregoing type an improved filtering system is achieved. In one preferred embodiment, the stand is of a C-shaped, hollow structure having a base, a vertical trunk and an upper cantilevered branch. The upper branch has a chamber into which a filter can be placed. The preferred filter is a basket having a hole through its floor that fits into a circular opening atop the upper branch of the stand. The hole in the basket is aligned with a corresponding spout in the underside of the upper branch of the stand.

In this preferred embodiment the basket is lined with an envelope made of filter paper and containing granulated activated charcoal. In a well-known fashion, the activated charcoal together with the filter paper effectively removes contaminants such as PCB's from potable water. Many contaminants are known to bind to activated charcoal while the filter paper will remove particulate, protein and protein bound molecules from the water. This preferred embodiment includes a cover having slotted sidewalls that promote drying of the filter to avoid algal, bacterial and fungal growth.

In an alternate preferred embodiment, the stand contains a reservoir which can be emptied through a dispensing valve and filled from the filter through a selection valve. The user can bring a full glass of water to the filtering system, pour it into the filter and, with the selection valve thrown to the reservoir position, fill the reservoir. Subsequent depression of the dispensing valve of the reservoir allows the user to employ the same glass to receive the filtered water.

In another preferred embodiment, the reservoir can be pressurized with carbon dioxide to carbonate the filtered water before dispensing it.

Also in a preferred embodiment, the vertical branch of the filter stand has a cavity used for storing an oversized basket for filtering large amounts of water. This oversized basket is relatively tall and would be cumbersome if left extending out of the upper cantilevered branch.

BRIEF DESCRIPTION OF THE DRAWINGS

The above brief description as well as other objects, features and advantages of the present invention will be more fully appreciated by reference to the following detailed description of the presently preferred but, nonetheless, illustrative embodiments in accordance with the present invention when taken in conjunction with the accompanying drawings wherein:

FIG. 1 is a perspective view of a filtering system in accordance with the principles of the present invention;

FIG. 2 is a sectional plan view of the stand of FIG. 1;

FIG. 3 is a vertical cross-sectional view of the filter of FIG. 1;

FIG. 4 is a vertical cross-sectional view of the cover of FIG. 1;

FIG. 5 is a vertical cross-sectional view of the upper portion of a modified stand, which is an alternate to that of FIG. 1;

FIG. 6 is a perspective view of an embodiment which is an alternate to that of FIG. 1;

FIG. 7 is a side elevational view, partly in section, of the filtering system of FIG. 6;

FIG. 8 is a detailed, vertical, cross-section of the upper portion of the reservoir of FIG. 7;

FIG. 9 is a detailed, vertical, cross-section of the connection between the reservoir and the stand of FIG. 7; and FIG. 10 is a detailed perspective view of a fragmentary portion of an alternate stand.

DETAILED DESCRIPTION OF THE PREFERRED EMBODIMENTS

Referring to FIG. 1, a filtering system is illustrated employing a stand 10 having base 12, vertical trunk 14 and an upper cantilevered branch 16. Stand 10 is generally C-shaped and is, in this embodiment, hollow. The top of stand 10 has upper circular hole 18.

Illustrated above circular hole 18 is basket-shaped filter 20, and dustcover 22, described hereinafter in further detail. Filter 20 fits within hole 18, thereby resting within the hollow chamber within stand 10. Also, cover 22 is sized to fully encircle filter 20 when it is held in hole 18. Cover 22 has slots 24 along its periphery for allowing venting and drying of filter 20.

Referring to FIG. 2, a horizontal cross-sectional view is given of the upper portion of stand 10, previously illustrated trunk 14 and upper cantilevered branch 16 being labeled identically. Visible in this view is lower hole 26 which is coaxial with the previously illustrated circular hole 18. A blocking means 28 is shown herein as a retaining wall comprising the boundary between trunk 14 and branch 16. Blocking means 28 is a wall which prevents water in branch 16 from cascading into trunk 14.

Referring to FIG. 3, previously illustrated, filter 20 is shown comprising removable basket 30 having a drain hole 32 centrally located on its floor. Removable basket 30 is shown lined with filtering sheets 34 which is, in this case, a pair of cellulose paper discs glued and/or crimped at their common edge to form an envelope. Disposed within the envelope of filtering sheets 34 is a quantity of granulated activated charcoal. Separate layers of paper are employed in constructing the filter layers for structural strength for holding charcoal in place and other layers for their capacity to remove particulate solids and proteins which are not removed by the charcoal. In a preferred embodiment the activated charcoal was graded at 10 to 24 mesh in a quality suitable for filtering potable water. Such activated charcoal can be purchased from several manufacturers, including Carborundum Company.

In this embodiment removable basket 30 is approximately 4 inches tall and has an outside diameter of 6 inches at its greatest diameter. Filter paper 34 and activated charcoal 36 are constructed to allow a filtering flow rate of approximately one quart per minute. It is expected that in some embodiments having demanding ecological standards, the activated charcoal can contain in it a protein designed to free the water of lipids at a reasonable rate. The protein can be obtained in a known way from soy bean or sunflower seeds. As an example, bovine serum albumin, fraction 5, etc. may be used.

Referring to FIG. 4, a vertical cross-sectional view is given of previously illustrated cover 22. Cover 22 comprises circular plate 40 affixed atop a slotted annular wall 42. Wall 42 has a plurality of slots 24 piercing it.

In FIG. 5 an alternate stand has a base (not shown) and trunk 14, identical to that previously illustrated in FIG. 1. However, this stand has an upper branch 44 containing conduit wall 46, a figure of revolution. Conduit wall 46 converges from the edge of circular hole 48 to lower hole 50. Conduit wall 46 is arranged to receive filter 20 (FIG. 3) and direct all of the potable water issuing from it directly to hole 50.

In FIG. 6, an alternate filtering system employs a C-shaped stand 110 having a base 112 supporting a vertical trunk 114, which has atop it an upper cantilevered branch 116. Stand 110 again has circular upper hole 118, functioning similarly to upper circular hole 18 of FIG. 1. Alcove 120 is essentially a rectangular cavity in trunk 114 whose floor is even with the topside of base 112. Alcove 120 is sized to fit drinking cup C, illustrated in phantom. Stand 110 has selection valve handle 124A, as well as a dispensing valve button 148A.

In FIG. 7 stand 110 is 15 inches tall, 7 inches across and 11 inches deep. Base 112 has an upper surface that is 7 inches square and 1 inch thick. Cantilevered branch 116 is 4 inches thick. Opening 18 is 6 inches in diameter. These dimensions are merely exemplary.

Referring to FIGS. 6 and 7, valve handle 124A controls valve 124. Valve 124 has a dispensing spout 124B, fitting in lower hole 126 of branch 116 for dispensing water when valve handle 124A is in the "pitcher" position (leftmost position in FIG. 6). When valve handle 124A is in the position illustrated in FIG. 6, it feeds line 128 which leads to reservoir 129 illustrated inside stand 110 (FIG. 7).

Mounted in upper circular hole 118 (FIG. 6) in the top of branch 116 is basket 130 (FIG. 7) having central drain hole 132 in its floor. The basket 130 is mounted flush atop valve 124. Valve 124 has appropriate gasket material to allow water to flow through hole 132 into valve body 124 without leaking. Of course, in another embodiment, various clips and retaining walls may be employed to effect a leakproof seal. The inside of basket 130 is fitted with a filter comprising paper envelope 134 containing in its center a cylinder of granular activated charcoal 136. The latter filter is essentially the same as filter 20 of FIG. 3, except for dimensional changes.

Stand 110 also has a cavity 140 which is sized to store basket 130 when not in use. For some embodiments stand 110 will employ a large and small basket; one may be stored in cavity 140 when the other is in use in hole 118.

The input to reservoir 129 is through a check valve (shown hereinafter) which prevents reverse flow along line 128. Reservoir 129 can be emptied through secondary dispensing spout 142 by depressing dispensing valve button 148A. Also shown herein is a source of carbon dioxide in the form of $CO_2$ cartridge 146, vertically mounted in the trunk of stand 110. The output line of cartridge 146 is connected through valve 149 to pressurize reservoir 129.

Referring to FIG. 8, the mechanism for pressurizing reservoir 129 with carbon dioxide is illustrated in a fragmentary view, in which only a portion of the roof of reservoir 129 is shown. Reservoir 129 has on its top, boss 152 having cylindrical cavity 154 guarded by cross-bar 156 to trap therein check ball 158. Cavity 154 leads to an overhead conduit 160 which is vented by a plurality of vents such as vent 162. Conduit 160 communicates with previously illustrated line 128. In FIG. 9, the floor of reservoir 129 has output port 129A. Fitted in output port 129A is pipe 150 which is connected to dispensing valve 148. Depressing valve button 148A reciprocates valve rod 148B to open valve 148 and allow fluid to flow through output port 129A to dispensing spout 142.

An alternate structure is given in FIG. 10 for the apparatus atop previously illustrated valve body 124. Valve body 124 is shown herein having above it a generally cylindrical liner 164. Cylindrical liner 164 is integral to circular opening 118 (identical to that previously illustrated in FIG. 6). Being constructed in this fashion, liner 164 can securely hold the previously illustrated basket (basket 130 of FIG. 7). Because this structure is closed, there is no leaking between wall 164 and valve body 124.

To facilitate an understanding of the principles associated with the foregoing, the operation of the equipment of FIGS. 6-9 will be briefly described. It will be appreciated that the structure of FIGS. 1-5 has the same but fewer functions. The apparatus is prepared by installing a fresh $CO_2$ cartridge 146 into stand 110 in the position illustrated in FIG. 7. Cartridge 146 may be installed through an appropriate access door (not shown). Next, basket 130 can be fitted with filter 134 containing activated charcoal 136. Valve handle 124A can be placed into its neutral or off position. Next, pitcher P (FIG. 7) can be filled with tap water and its contents emptied into basket 130. Subsequently, pitcher P is placed in the position shown, that is, atop base 112 of stand 110, under dispensing spout 124B. Thereafter, valve handle 124A can be moved to the "pitcher" position. As a result, water flows through filter paper 134 and activated charcoal 136 being cleansed of contaminants in the process. Upon entering valve body 124 filtered water is discharged through dispensing spout 124B, thereby refilling pitcher P with purified water.

In some cases, the user may only want a single glass of water for immediate consumption. Therefore, cup C containing tap water can be poured into container basket 130 with handle 124A in the "glass" position. As a result, filtered water leaving basket 130 flows through valve body 124 into feed line 128, filling reservoir 129 which is vented by bores 162. Once the contents of cup C is filtered and deposited in reservoir 129, the user may place cup C in the position illustrated in FIG. 7. Thereafter, dispensing valve 149 can be operated by depressing valve button 148A, thereby refilling cup C.

Alternatively, the water in reservoir 129 can be carbonated before dispensing by opening carbonation valve 149, thereby inducing high pressure carbon dioxide from cartridge 146 into reservoir 129. This relatively high pressure in reservoir 129 drives check ball 158 (FIG. 9) upwardly against cavity 160, thereby sealing reservoir 129. After waiting a sufficient amount of time to allow carbonation, the dispensing valve 148 can be operated by depressing valve button 148 thereby allowing carbonated water to flow into cup C. When the user is done with the apparatus, he may place a dust cover over basket 130. Alternatively, he may store basket 130 and its filter in cavity 140 again placing an appropriate dust cover over it. Because the filter can easily and rapidly dry, algal, bacterial and fungal growth is suppressed.

It is to be appreciated that various modifications may be implemented with respect to the above-described preferred embodiments. For example, while generally rectangular components are shown for the stand, it will be appreciated that curved surfaces may be chosen for practical or aesthetic reasons. In addition, the various dimensions described herein may be altered depending upon the desired capacity and flow rate. Also, while a particular basket structure is shown, it will be understood that different shapes of baskets may be used having alternate kinds of drainage holes, including conduit-like spouts extending from the bottom of the basket and shaped to engage appropriate fittings within the stand. In addition, alternate dust covers can be employed, it being only desirable that the cover be vented in some way to allow drying of the filter. It will be appreciated that various alternate check valves, such as flap-type checks, may be employed in place of the one described. Also, it will be understood that the size and shape of the reservoir can be altered, depending upon the available space.

Obviously, many modifications and variations of the present invention are possible in light of the above teachings. It is, therefore, to be understood that within the scope of the appended claims, the invention may be practiced otherwise than as specifically described.

What is claimed is:

1. A filtering system for potable water, comprising:
a removable basket having on its bottom means defining a central aperture;
a filtering sheet lining the inside of said basket, said filtering sheet being formed into a flexible envelope;
activated charcoal granules disposed within said envelope for filtering potable water; and
a stand having an upper cantilevered branch with means defining an opening sized to hold said basket, said basket being detachably mounted in said opening, said stand being arranged to allow water to flow through said granules without standing, said stand being openly structured to allow air drying of said granules.

2. A filtering system according to claim 1, further comprising:
a manually operable dispensing valve mounted on said upper branch of said stand and coupled to said basket for dispensing from said stand potable water filtered through said basket.

3. A filtering system according to claim 2, wherein said stand comprises:
a reservoir serially connected to said dispensing valve for holding potable water filtered by said basket.

4. A filtering system according to claim 3, further comprising:
a dispensing spout mounted on said upper branch of said stand; and
a selection valve connected to said basket downstream thereof, for alternately routing potable water from said basket to said reservoir and said dispensing spout.

5. A filtering system according to claim 3, further comprising:
a check valve connected between said reservoir and basket for preventing a reverse flow from said reservoir into said basket; and
a manually operable source of carbon dioxide connected to said reservoir for pressurizing it and carbonating its potable water.

6. A filtering system according to claim 1, wherein said upper cantilevered branch includes within it means defining a chamber having an upper circular hole and a smaller lower hole, said upper hole being sized to support said removable basket.

7. A filtering system according to claim 6, wherein said stand is hollow and "C" shaped, said stand having: blocking means for directing water flow from said upper to said lower hole.

8. A filtering system according to claim 7 wherein said stand has:
a conduit wall connecting said upper hole to said lower hole.

9. A filtering system according to claim 1, wherein said stand includes a base and a trunk connecting said upper branch to said base, said trunk having an alcove sized to fit a cup, said filtering system further comprising:
a primary dispensing spout mounted on the underside of said upper branch of said stand
a secondary dispensing spout mounted in said alcove; and
a selection valve connected to said basket downstream thereof for alternately routing potable water from said basket toward said primary and secondary dispensing spout.

10. A filtering system according to claim 9, wherein said stand has means defining a cavity extending into said trunk and sized to store said basket.

11. A filtering system according to claim 1, further comprising:
a cover sized to cover said opening, said cover having a circular plate affixed atop a slotted annular wall.

12. A filtering system according to claim 1, wherein said stand includes a base and a trunk connecting said upper branch to said base, said basket being taller than said branch, but not said trunk; said stand having means defining a cavity extending into said trunk and shaped to detachably hold said basket, whereby said basket can be stored in said cavity.

* * * * *